(12) United States Patent
Katayama et al.

(10) Patent No.: US 6,561,668 B2
(45) Date of Patent: May 13, 2003

(54) COMPUTER WITH KEYBOARD ILLUMINATOR FOR USE IN OPERATING ENVIRONMENTS WITH INADEQUATE AMBIENT LIGHTING CONDITIONS

(75) Inventors: Ken Katayama, Fujisawa (JP); Yukifumi Nakazawa, Tokyo-to (JP); Yoshio Nishioka, Hadano (JP); Takahide Wada, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 92 days.

This patent is subject to a terminal disclaimer.

(21) Appl. No.: 09/754,692

(22) Filed: Jan. 3, 2001

(65) Prior Publication Data

US 2002/0085371 A1 Jul. 4, 2002

(30) Foreign Application Priority Data

Jan. 5, 2000 (JP) ........................................ 2000-000423

(51) Int. Cl.⁷ ............................................... F21V 33/00
(52) U.S. Cl. .......................... 362/85; 362/155; 362/109; 362/802
(58) Field of Search ........................ 362/85, 155, 109, 362/802, 800

(56) References Cited

U.S. PATENT DOCUMENTS

| 5,183,325 A | * | 2/1993 | Hurdle ........................ 362/109 |
| 5,379,201 A | * | 1/1995 | Friedman ..................... 362/191 |
| 6,053,622 A | * | 4/2000 | Horowitz et al. ........... 362/276 |
| 6,161,944 A | * | 12/2000 | Leman ........................ 362/276 |
| 6,243,819 B1 | * | 6/2001 | Jung ........................... 713/320 |
| 2002/0064055 A1 | * | 5/2002 | Takahashi et al. .......... 362/555 |

* cited by examiner

Primary Examiner—Sandra O'Shea
Assistant Examiner—Ronald E. DelGizzi
(74) Attorney, Agent, or Firm—Carlos Munoz-Bustamante; Bracewell & Patterson, LLP

(57) ABSTRACT

In a portable computer, an LED holder is provided in the upper portion of an LCD and an LED is attached inside the LED holder. Light emitted from the LED passes through an aperture provided in the bottom portion of the LED holder and illuminates a keyboard. Furthermore, switching on or off the LED is manually performed by a switch installed in the portable computer and is also controlled from a utility program, etc., by a switching controller circuit installed inside a main body.

12 Claims, 12 Drawing Sheets

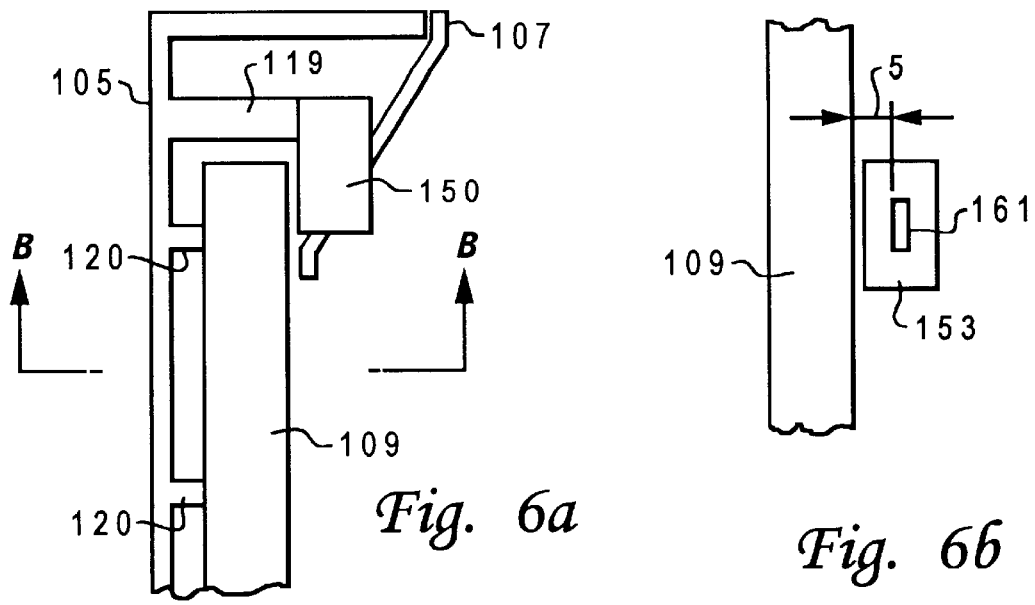
*Fig. 6a*
*Fig. 6b*
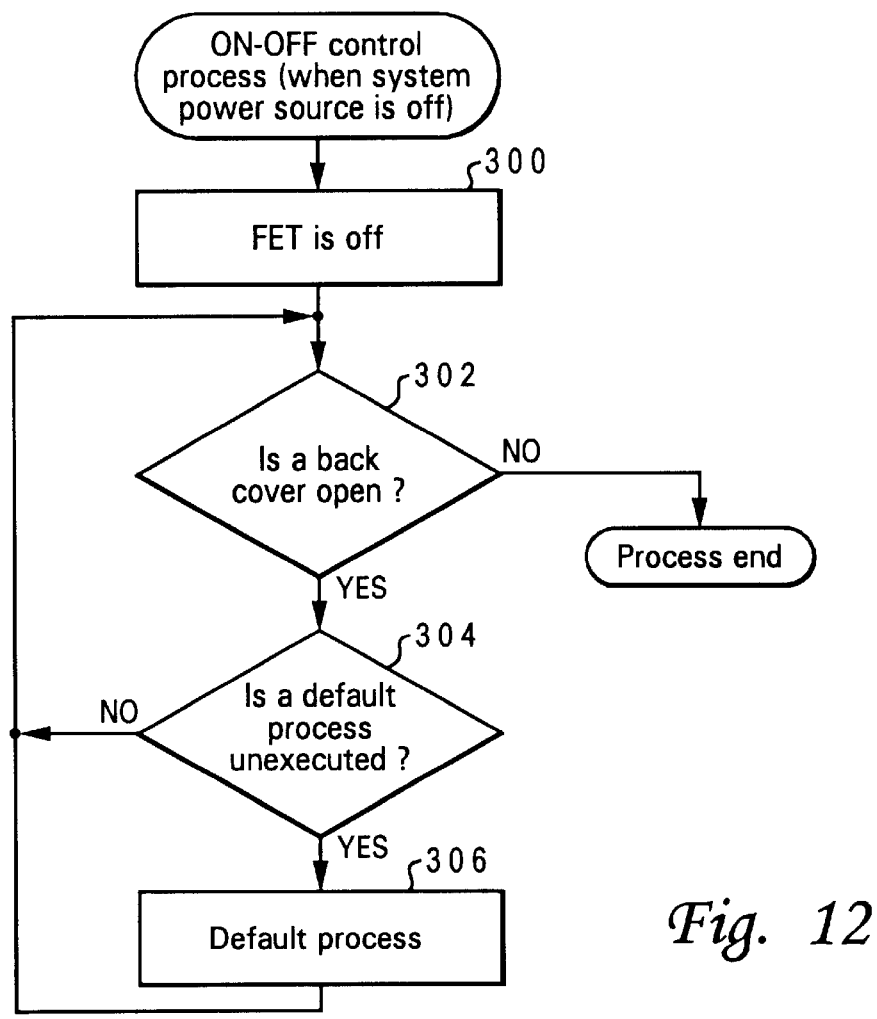
*Fig. 12*

COMPUTER WITH KEYBOARD ILLUMINATOR FOR USE IN OPERATING ENVIRONMENTS WITH INADEQUATE AMBIENT LIGHTING CONDITIONS

BACKGROUND OF THE INVENTION

1. Technical Field

The present invention relates to computers with an illuminator for a keyboard, and more particularly to battery-driven computers with a light source for illuminating a keyboard thereof.

2. Description of the Related Art

Portable computers are excellent in portability because they are small in size and light in weight, and can be used at any place independently of commercial power sources by mounting a battery charger in the interior. Generally, the portable computers are provided with a liquid crystal display (LCD), and many contrivances have been made in order to economize the consumption power of the battery. Since computers have generally been used in recent years at places remote from offices, there is an increasingly strong demand for using computers in a dark environment, for example, in an airplane or a living room. To use computers, there is a need for users to operate the keyboard and the pointing device while viewing the LCD. Because most LCDs are provided with a back light at the back side thereof, users can view the screen even if the surroundings are dark. However, since the keyboard and pointing device do not emit light unless they employ fluorescent paint or material, users cannot visually recognize a key position or a script on the key top in the dark and therefore users, other than an experienced person who can handle computers without relying on vision, cannot sufficiently use computers under such an environment. In addition, the back light of the LCD does not provide illumination enough to operate the keyboard.

Published Unexamined Japanese Utility Model Application No. 59-4493 discloses a technique of providing an illuminator in electronic equipment such as an electronic register and illuminating a keyboard thereof, as shown in FIG. 1. The illuminator is provided in the upper end of the front surface of the register, and when the register is used, the keyboard can be illuminated. This electronic register, however, is not a portable type but an installed type and is based on the assumption that commercial power sources can be utilized. In addition, the light source shown in FIG. 1 is considered to be an incandescent electric light. Furthermore, switching of the light source is realized only by manual operation of a switch installed in the illuminator.

Published Unexamined Japanese Patent Application No. 8-314598 discloses a technique of illuminating the keyboard of a personal computer (PC), as shown in FIG. 2. The light source is disposed between the keyboard and the display section and attached on the main body of the PC. In addition, the light source is partially covered so that light is not emitted to a place other than the keyboard. Furthermore, in the aforementioned specification No. 8-314598 it has been described that "In addition, when the light source is attached to the liquid crystal section, it becomes possible to visually recognize the keyboard in the dark place, but there is a problem that (1) a large-capacity light source is required, because the liquid crystal section and the keyboard are illuminated and (2) in the case of a liquid crystal section with a back light, light enters the liquid crystal and therefore disturbs the field of vision. Therefore, the aforementioned specification No. 8-314598 has taught that attaching the light source to the liquid crystal section has been given up because there is a problem from the viewpoint of both the capacity of the light source and the visual field with respect to the liquid crystal section.

Published Unexamined Japanese Utility Model Application No. 7-25415 discloses a technique of providing a detachable light source in a notebook-sized PC and illuminating the keyboard. In this publication, the light source is not attached to the main body of the PC and is provided as a separate unit.

As described supra, the portable computer is characterized in that it is excellent in portability. Therefore, in the case of providing a light source for illuminating the keyboard, it is important to select a method of attachment and an illuminator type so that the portability is not degraded. It is also important that an illuminator does not shorten the operating time of a battery.

The above-mentioned conventional techniques have shown the necessity of illuminating the keyboard of the portable computer. However, as described infra, it is difficult to adopt these techniques, while the characteristic of an actual portable computer is being utilized.

Published Unexamined Japanese Utility Model Application No. 7-25415 does not adopt the method of attaching an illuminator to the main body of the computer and adopts the detachable method. In this method, however, there is a need to carry the light source separately from the computer. Thus, this method cannot utilize the characteristic of the PC that is characterized by portability and also the operation of detachably attaching the light source will give users trouble.

In Published Unexamined Japanese Patent Application No. 8-314598, the light source is disposed between the keyboard and the LCD. Disposing the light source at this position, however, will cause some problems. First, in portable computers, a large area is used on this side of the keyboard in order to ensure the palm rest portion that holds the palms of a user when the user operates the keyboard. For this reason, in many cases it is difficult to ensure space for the light source at the position shown in FIG. 2. In addition, there is a need to make the light source higher than the plane of the key top of the keyboard and provide a cover, in order to illuminate the entire keyboard from the position of the light source shown in FIG. 2. For this reason, if an attempt is made to close the cover including the LCD, the computer will become considerably thick. Furthermore, because the entire keyboard is illuminated with the light source disposed at the position shown in FIG. 2, there is a need to provide a plurality of point light sources or an elongated light source and therefore a problem with the consumption power of the battery will arise.

The aforementioned Published Unexamined Japanese Utility Model Application No. 59-4493 discloses that the light source is disposed on the upper portion of the display section, but it does not disclose a specific idea for disposing the light source at the same position in a portable computer. Although this conventional technique discloses an idea for illuminating the keyboard with the light source disposed on the upper portion of the display section, there is no description of a specific method for disposing the light source on the upper portion of the LCD of a portable computer.

In addition, in any of the above-mentioned conventional techniques, there is no description of a specific method that switches on and off the light source, except for manual operation of the switch.

After all, the technique of illuminating the keyboard of a portable computer with a light source disposed on the upper portion of the LCD has hitherto been difficult and has not been realized. But, when the LCD is open in order to use the portable computer, there is no obstacle to intercept light between the upper portion of the LCD and the keyboard and therefore it follows that the upper portion of the LCD is most efficient as a position of illuminating the keyboard. However, since a distance from the light source to the keyboard becomes longer, it becomes important that an illuminator as a light source have a great luminous intensity and a lower energy consumption amount.

Furthermore, when the keyboard is illuminated from the upper portion of the LCD, there is a need to elaborate a plan so that the visual recognition of the LCD is not disturbed by direct light incident on the LCD. Moreover, it is useful that the ON-OFF state of a light source can be flexibly controlled as desired by users. Furthermore, it may be stated that it is practical from the standpoint of a reduction in power dissipation to control the ON-OFF state of a light source according to the system state.

In view of the above-mentioned facts, the primary object of the present invention is to provide a computer which is capable of being utilized even by battery-driven operation with less space and less consumption power and also realizing keyboard illumination capable of user's flexible switching control without having an adverse effect on visual recognition of the display.

SUMMARY OF THE INVENTION

In accordance with a first aspect of the present invention, there is provided a computer with an illuminator for a keyboard capable of battery powered operation, having a keyboard, and a display comprising: an LED holder installed at approximately an upper edge of the display, the holder having a wall with an aperture; an LED installed inside the wall of the LED holder so that light radiated from the LED illuminates the keyboard by passing through the aperture; a switch to manually switch on or off the LED; and a switching controller circuit to control the switching of the LED in response to a signal from a main CPU mounted inside a main body of the computer or keyboard.

First, in the present invention, a light emitting diode (hereafter mentioned as LED) is selected as a light source for keyboard illumination. Generally, the LED has been used in displaying the operating state of electronic equipment and has been used as a device for displaying states rather than as a device for illumination. However, since LEDs with a relatively high luminous intensity suitable for illumination have been developed in recent years, the inventor of this application is led to an idea of applying the LED to the illumination of the keyboard of a portable computer to solve the problems not solved in the background art. The LED is suitable as an illuminator for a keyboard to be mounted on a battery drivable computer, because it is small, low in consumption power, and does not almost shorten the operating time of a battery.

In addition, an LED holder is attached to substantially the upper edge of a display and an LED is held within the LED holder. This position is most suitable as a place for attaching a light source because there is no obstacle with respect to keyboard illumination. In addition, by disposing a light source here, only a single point light source can illuminate the entire keyboard and there is no need to prepare a plurality of point light sources, a line light source, or a surface light source. The wall of the LED holder is formed with an aperture, and light from this LED is passed through the aperture and guided to the keyboard. The distribution of the light passed through the aperture can be controlled by adjusting the position at which the LED holder is attached and also the size and position of the aperture in the wall of the LED holder.

In addition, since the computer according to the present invention is equipped with the switch for manually switching on or off the LED, users can illuminate the keyboard as needed, by operating this switch.

Furthermore, because the computer is equipped with the switching controller circuit, switching of the LED is realizable not only by manual operation of the aforementioned switch but also by transmitting a signal, which instructs switching of the LED, from the main CPU mounted inside the main body of the computer or keyboard to the switching controller circuit.

In accordance with a second aspect of the present invention, a part of the light radiated from the LED is masked by the wall of the LED holder, and the remaining light passing through the aperture does not directly illuminate the display. This is realizable by suitably selecting, for example, the configuration of the holder, the attached position of the holder, the position of the aperture, the size of the aperture, and the like. Therefore, the second form of the present invention has solved the problem that when a light source is provided in the upper portion of the display, light radiated from the light source will disturb the visual recognition of the display, such as the problem pointed out in the background art.

In accordance with a third aspect of the present invention, when an angle formed by the display and the keyboard is at approximately 90 degrees, light from the LED passes through the aperture so that it illuminates substantially the keyboard alone. The angle of approximately 90 degrees is considered to be the smallest angle when users use the computer. If the entire keyboard is illuminated at this angle, the illumination of the keyboard is sufficiently ensured even when the angle formed by the display and the keyboard is greater than 90 degrees. As with the second embodiment, this is also realizable by suitably selecting, for example, a parameter related to the aperture.

In accordance with a fourth aspect of the present invention, the LED holder is provided with a shutter that adjusts the opening degree of the aperture. Therefore, the user can adjust light distribution in accordance with the inclined state of the display by manually adjusts the position of the shutter.

In accordance with a fifth aspect of the present invention, the switching controller circuit can be constructed to include at least either a keyboard controller to perform discrimination of depressed keys of the keyboard or a power source controller to control power to the entire system in response to an instruction signal from the main CPU. Since the switching controller circuit includes at least either the keyboard controller or the power source controller, the LED can be easily switched on or off in interlock with the control function of the keyboard controller or power source controller.

In accordance with a sixth aspect of the present invention, there is provided a portable computer with an illuminator for a keyboard capable of battery powered operation, having a main body with a keyboard on its upper surface, a back cover capable of being open and closed connected at a lower edge thereof to approximately a rear edge of the main body, and a liquid crystal display installed in the back cover, the portable computer comprising: an LED holder installed at approximately the center of approximately an upper edge of the back cover, the holder having a wall with an aperture; an LED installed inside the wall of the LED holder so that light radiated from the LED illuminates the keyboard by passing through the aperture; and a switching circuit constituted by connecting in series a cover switch which is switched on or off according to an open or closed state of the back cover and a manual switch which manually switches on or off the LED, the switching circuit be connected in series to the LED. In portable computers with a liquid crystal display (hereinafter referred to as an LCD), there are a great number of cases requiring keyboard illumination, compared with installation type. Accordingly, the present invention is particularly effective.

In addition, since the aforementioned switching controller circuit is connected in series with the LED, it is possible to switch on or off the LED by the cover switch as well as by the manual switch. That is, the cover switch is switched off if the back cover is closed. Therefore, the LED can be switched off without switching off the manual switch. As a result, even if the back cover is closed without switching off the LED, wasteful power consumption can be prevented.

In accordance with a seventh aspect of the present invention, the portable computer with an illumination for a keyboard having the sixth aspect further comprises: a switching element connected in parallel with the manual switch; and a control circuit to switch on or off the switching element according to a signal from a main central processing unit mounted inside the main body, or from the keyboard. As the switching element, a field effect transistor (hereinafter referred to as a FET) can be selected. Since the switching element is connected in parallel with the manual switch, the LED can be switched on or off by switching on or off the switching element by the control circuit, without operating the manual switch.

The control circuit can be configured by including at least either a keyboard controller mounted inside the main body for performing discrimination of depressed keys of the keyboard, or a power source controller to control power to the entire system in response to an instruction signal from the main central processing unit. Because the control circuit includes at least either the keyboard controller or the power source controller, the LED can be easily switched on or off in interlock with the control function of the keyboard controller or power source controller.

BRIEF DESCRIPTION OF THE DRAWINGS

FIG. 6 is a sectional view showing how the LED holder is attached;

FIG. 12 is a flowchart showing the flow of processing that is executed in the switching controller circuit of FIG. 11 when the system power source is off;

FIG. 13 is a flowchart showing the flow of processing that is executed in the switching controller circuit of FIG. 11 when the system power source is on;

DETAILED DESCRIPTION OF THE PREFERRED EMBODIMENT

Figure 1A:
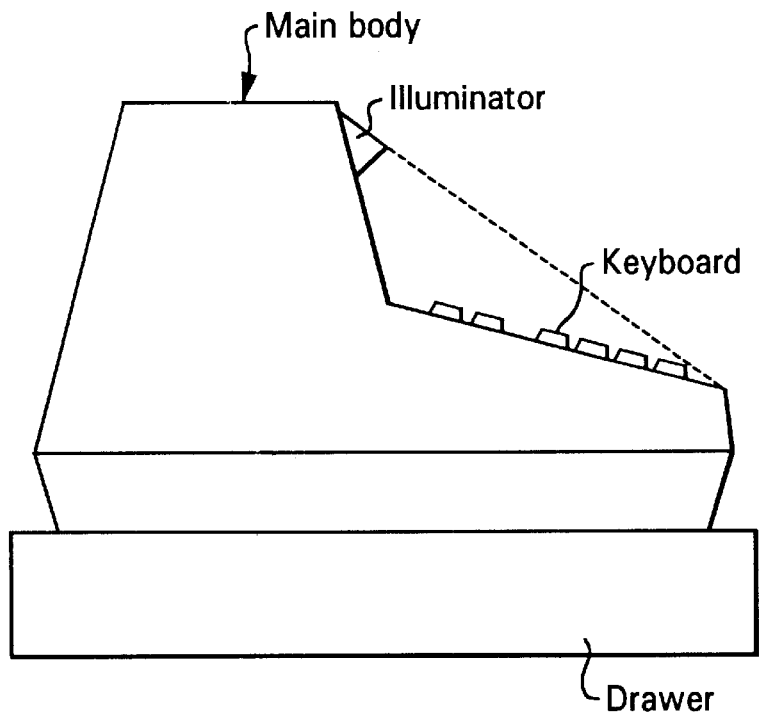
FIG. 1 is a schematic diagram showing a conventional register with an illuminator for the keyboard.
Figure 1B:
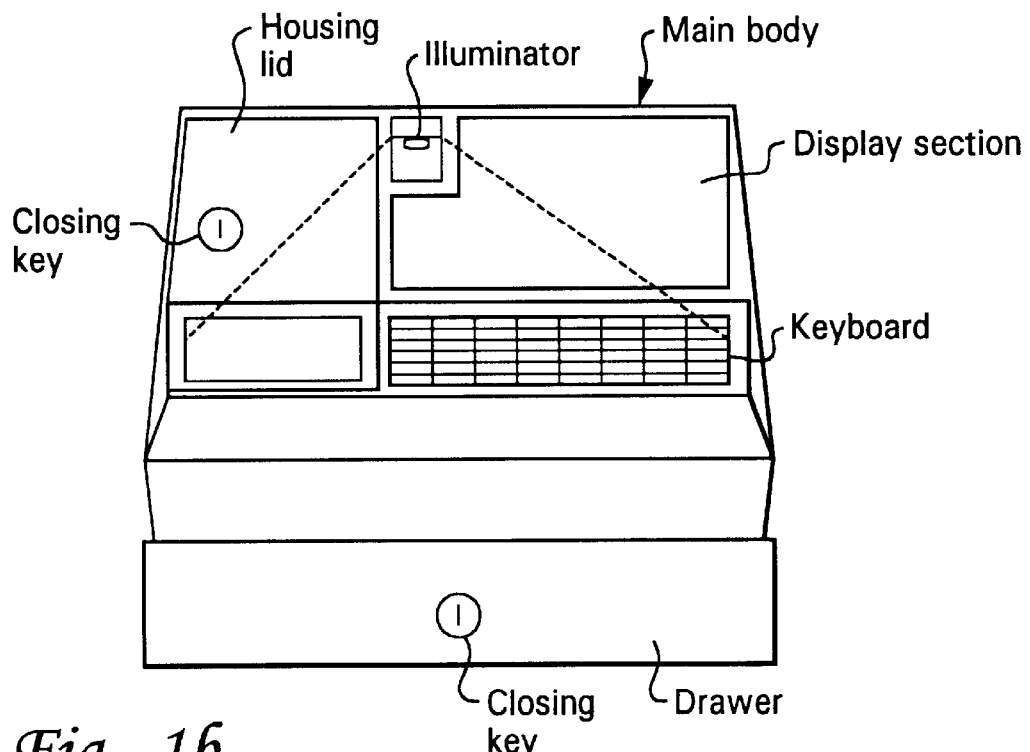
Figure 2:
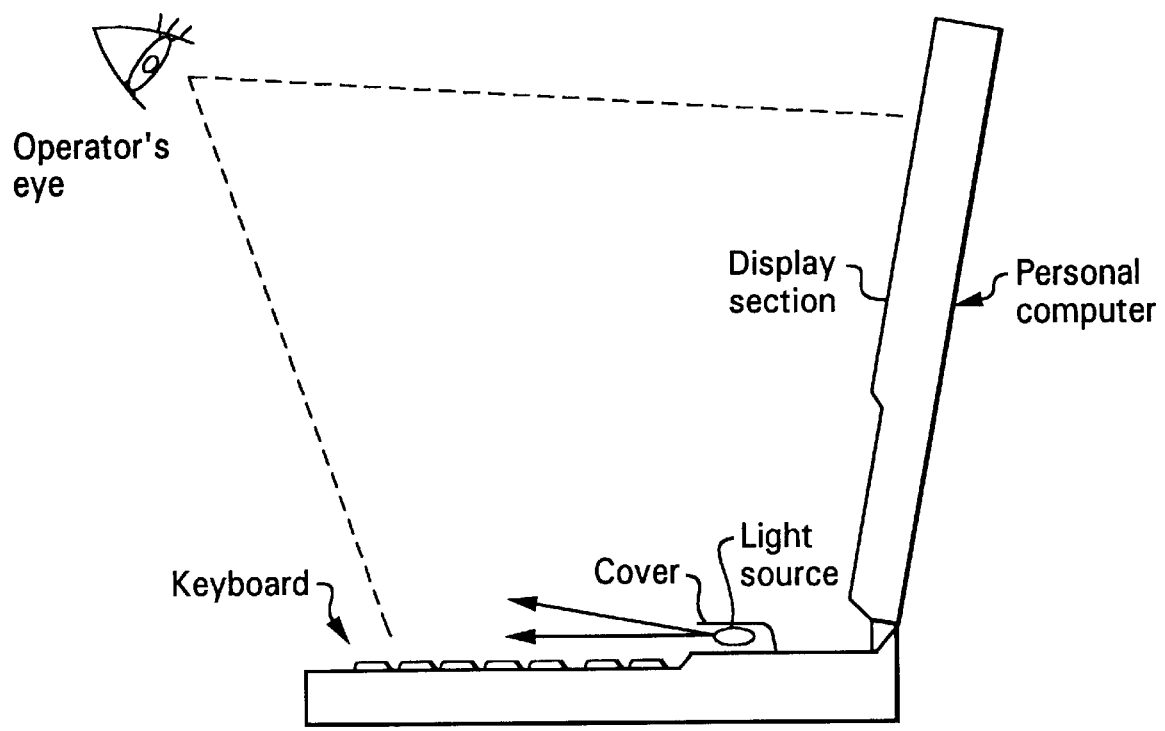
FIG. 2 is a schematic diagram showing a conventional personal computer with a light source for the keyboard.
Figure 3:
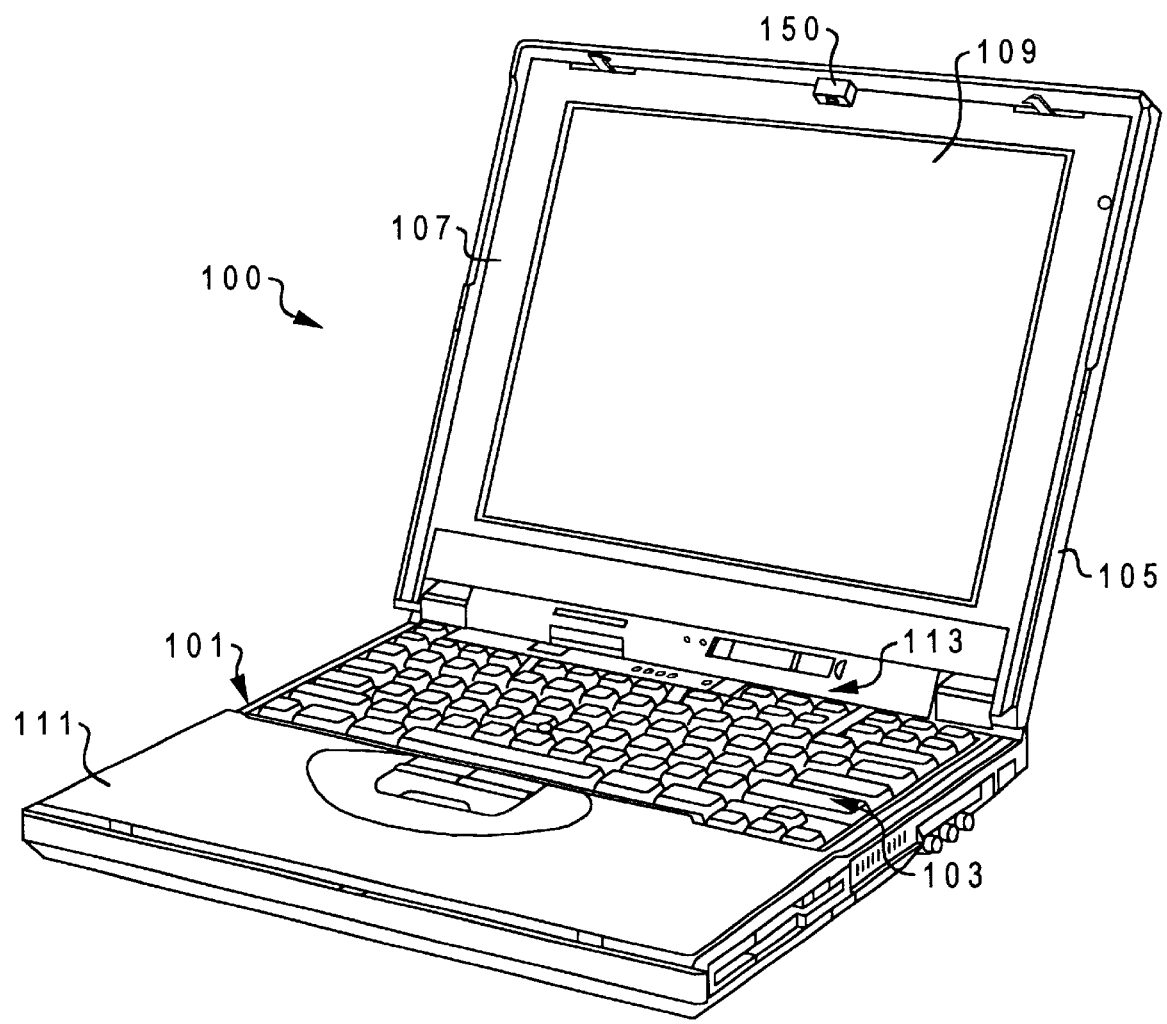
FIG. 3 is a perspective view showing an embodiment of a portable computer according to the present invention.

FIG. 3 shows an embodiment of a notebook-sized portable computer 100 to which the present invention is applied. A keyboard 103 is disposed on the upper surface of a main body 101, and a palm rest 111, for holding the palms of a user when the user operates the keyboard, is disposed on this side of the keyboard. A back cover 105 is attached at one end thereof to approximately an end of the main body 101 so that it can be opened and closed. The back cover 105 plays a role of covering the keyboard 103 and the palm rest 111 in its entirety when the computer is not used. A liquid crystal display (LCD) 109 is attached to the back cover 105 and a bezel 107 is also attached to the back cover 105 so that it covers the circumference of the LCD 109 and the circumference of the back cover. In using the computer 100, the user rotates the back cover 105 to 90 degrees or greater with respect to the main body 101 and operates the keyboard 103 while viewing the LCD.

The computer 100 is further provided with an LED holder 150, which holds an LED for keyboard illumination, and an LED switch 113 in the interior thereof. With the back cover 105 opened, the user operates the switch 103 to light the LED, whereby the keyboard 103 can be illuminated.

Figure 4:
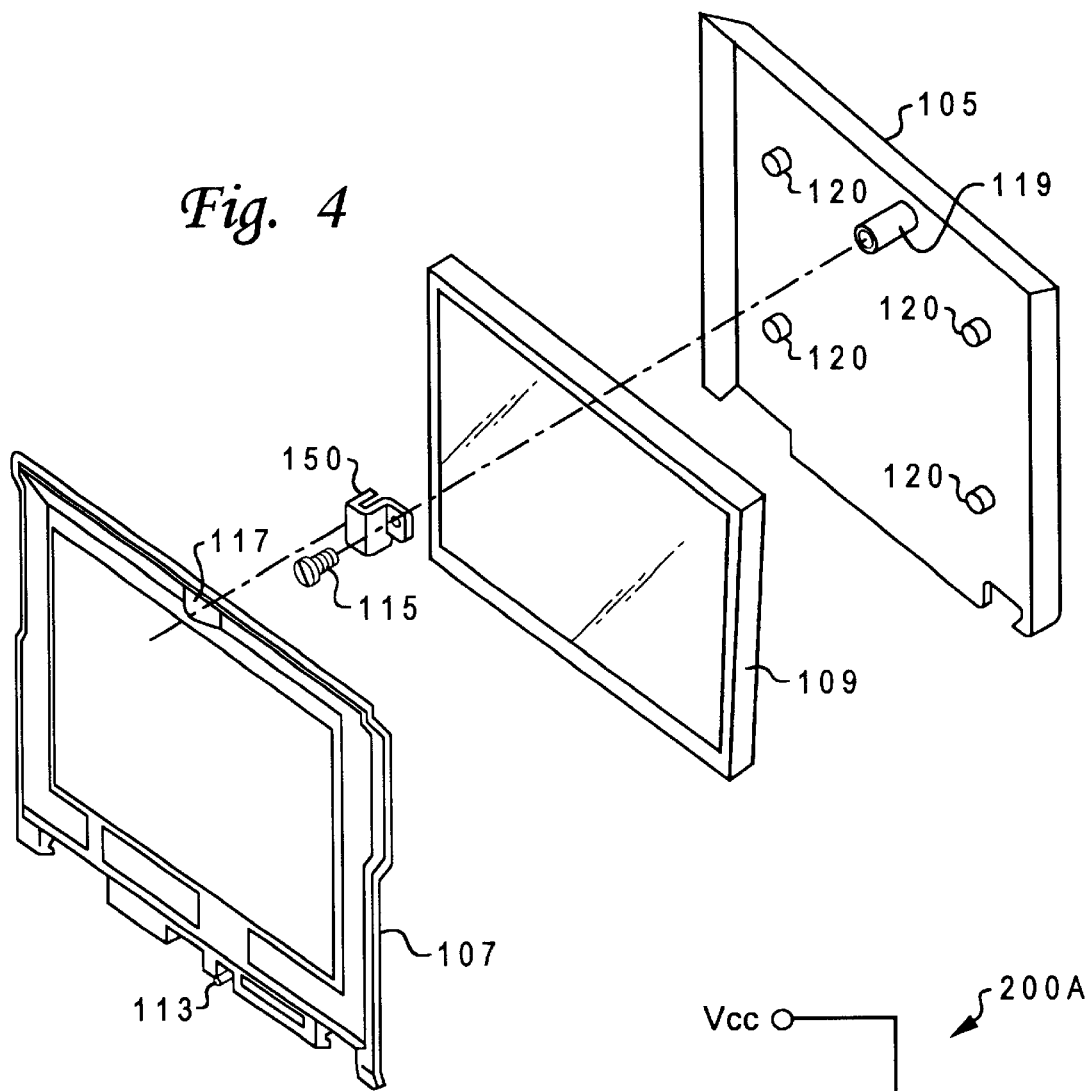
FIG. 4 is an exploded view showing the disassembled state of the back cover, the LCD, and the LED holder shown FIG. 3.
Figure 5A:
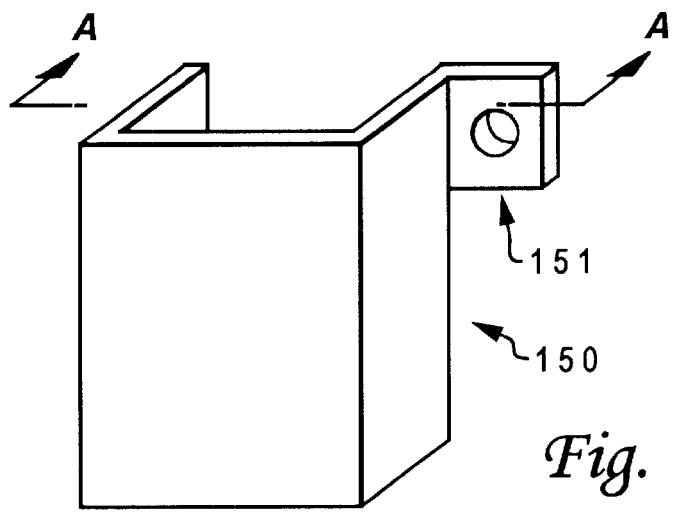
FIG. 5 is a detailed diagram showing an embodiment of the LED holder shown in FIG. 4.
Figure 5B:
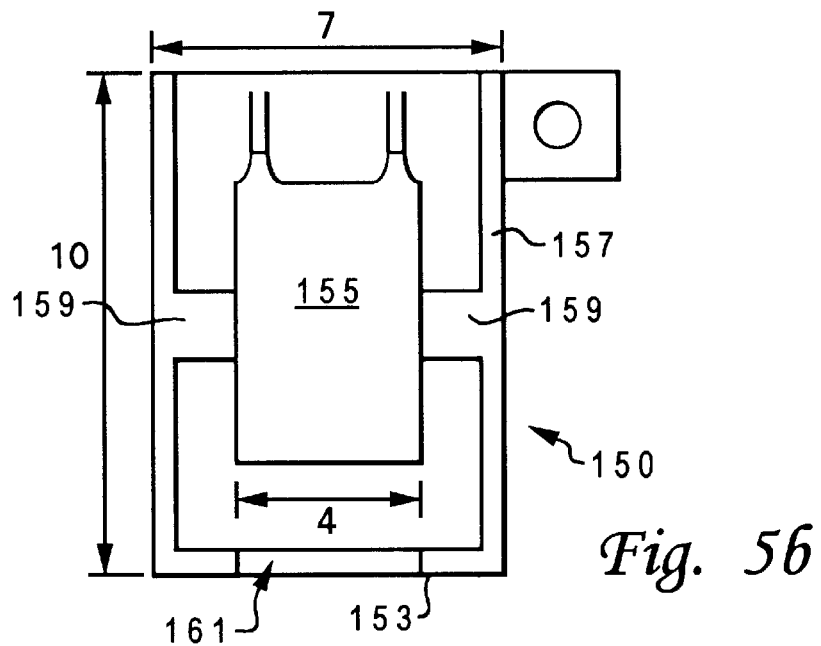
Figure 5C:
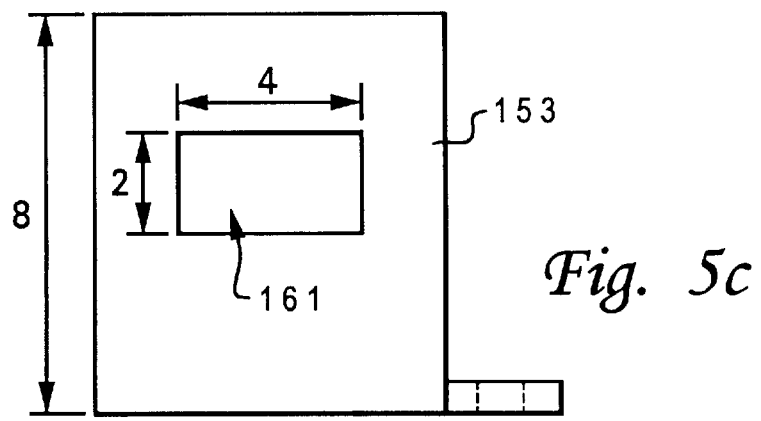

FIG. 4 illustrates the disassembled state of the back cover 105, the LCD 109, the bezel 107, and the LED holder 150. The back cover 105 is provided with a boss 119 threaded inside, and the LED holder 150 is passed through the aperture 117 of the bezel 107 and is attached to the boss 119 by means of a screw 115. The back cover 105 is formed with bosses 120 that attach the LCD 109 to the back cover 105. The bezel 107 is provided with the switch 113. FIG. 5 shows an enlarged view of the LED holder 150. In FIG. 5A the fixing portion 151 of the LED holder 150 is attached to the boss 119. FIG. 5B shows a sectional view taken along line A—A in FIG. 5A; FIG. 5C shows a bottom view of the boss 113 shown in FIG. 5B. An LED fixing portion 159 extends inward from a side wall 157, the central portion of the LED fixing portion 159 being provided with an aperture so that it can insert and fix the LED 155. The LED 155 is inserted to this aperture from the upper portion and fixed to the LED holder 150. In addition, as shown in FIG. 5C, the bottom portion 153 of the LED holder 150 is provided with an aperture 161. Part of the light emitted from the LED 155 is intercepted by the bottom portion 153, while the remaining part is emitted outside the LED holder 150 via the aperture 161.

This embodiment has adopted the LED as the light source. As the LED 155, NSPWF50BS manufactured by Nichia Chemical Industries, Ltd., for example, can be utilized. The LED 155 has luminous intensity 0.26 cd and power consumption 72 mW and thus has characteristics of luminous intensity and lower consumption power sufficient to illuminate the keyboard. In addition, the sectional size of the light emitting portion is as small as 2–4 mm and can be housed in the LED holder the size shown in FIG. 5. Because the battery capacity of the computer 100 is 4800 mAh, the rate of the power consumption of the LED to the battery capacity is about 0.4%. The LED 155 is able to operate for 3 hr under standard operating conditions with the LED 155 off, and even if the LED 155 is kept on under the same condition, the operating time of the computer 100 will be shortened only by about 45 sec.

FIG. 6 shows the attached state of the LED holder 150 to the back cover 105. The LED holder 150 and the LCD 109 are attached to the back cover 105 by the boss 119 and the bosses 120, respectively. The bezel 107 covers the circumference of the LCD 109 and the end portion of the back cover 105, and at the portion to which the LED holder 150 is attached, the bezel 107 is provided with an aperture so that the bottom portion 153 of the LED holder appears outside the bezel.

In FIG. 6(B), the size of the aperture 161, the distance of the aperture 161 from the surface of the LCD 109, and the angle of the bottom portion 153 with respect to the surface of the LCD are important. The reason for this is that these parameters become major causes which determine the light distribution characteristic of the light radiated downward from the LED holder 150. In this embodiment, the size of the aperture 161 is 4 mm–2 mm, the distance from the LCD surface to the aperture 161 is 5 mm, and the angle of the bottom portion 153 with respect to the LCD surface is approximately 90 degrees. This light distribution prevents light radiated by the LED 155 from directly illuminating the LCD surface, whereby the visual recognition of the LCD is not disturbed. Furthermore, the light distribution characteristic is determined so that, during use of the computer, the entire keyboard is effectively illuminated in the range of a predetermined inclined angle of the back cover 105. The setting of the light distribution characteristic will be described in detail infra.

Figure 7A:
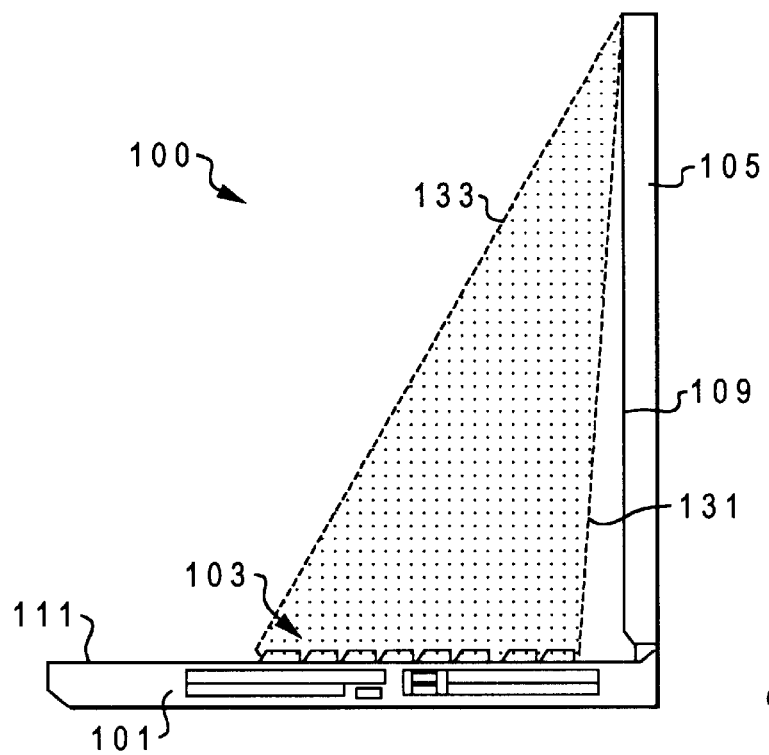
FIG. 7 is a diagram for describing the light distribution characteristic of the light emitted from an LED held by the LED holder.

FIG. 7 shows, in the portable computer 100, the light distribution characteristic of the light emitted from the LED holder 150 housing the LED 155. FIG. 7A is a side view, the back cover 105 being opened so that it is held at approximately 90 degrees to the main body 101. In the inclined state of the LCD, a ray of light 131 nearest to the LCD 106 illuminates the end of the keyboard nearest to the LCD. The light ray 131 is determined by the angle of the bottom portion 153 of the LED holder 159 with respect to the LCD surface, the size of the aperture 161, and the distance of the aperture 161 from the LCD surface, as shown in FIG. 6B. In FIG. 7A, the light ray 131 has been illustrated so that it illuminates the portion of the keyboard 103 nearest to the LCD 109, but the illustration has been made of a light ray having illuminance suitable for keyboard illumination. Actually, a weak ray of light going from the aperture 161 toward the LCD 109 is also emitted.

Figure 8:
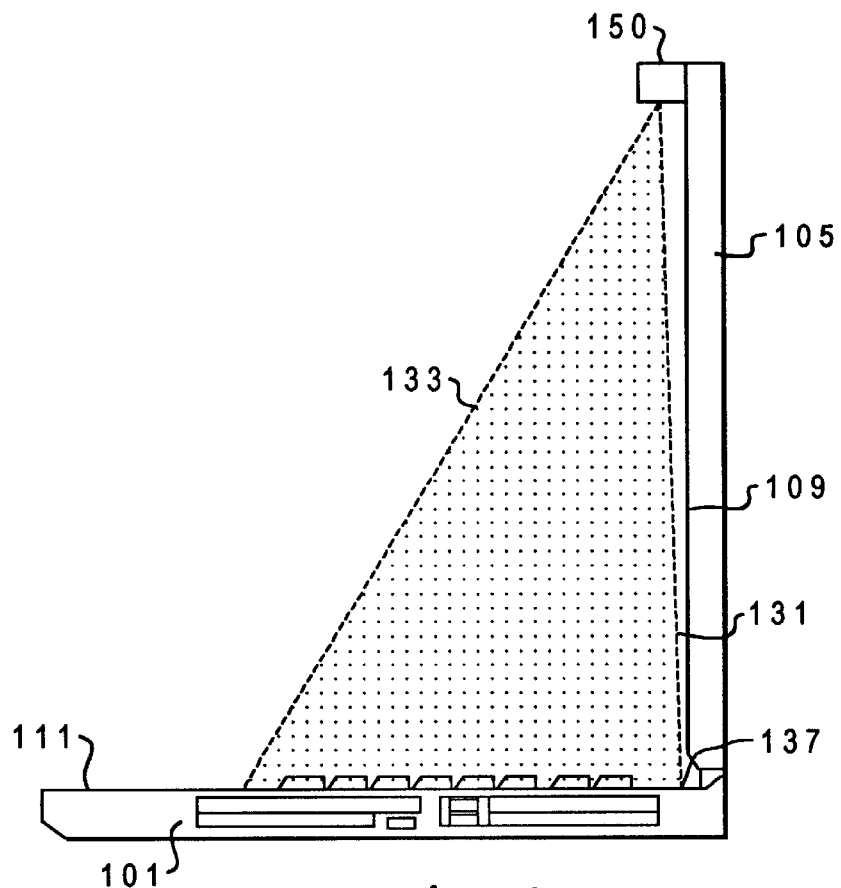
FIG. 8 is a diagram for describing the light distribution characteristic.

The distribution of this weak light ray will be described with FIG. 8. Part of the light emitted from the LED holder 150 includes a weak light ray going in the direction of the LCD 109, like the light ray 135. However, in this embodiment, the above-mentioned parameters, such as the size of the aperture 161 and the like, are determined so that the light ray 135 does not go to the LCD side beyond the coupled portion 137 between the back cover 105 and the main body 101. Therefore, even when the back cover is used at any angle, there is no possibility that the light will illuminate the LCD 109 directly and therefore there is no possibility that the visual recognition of the LCD will be disturbed.

Figure 7B:
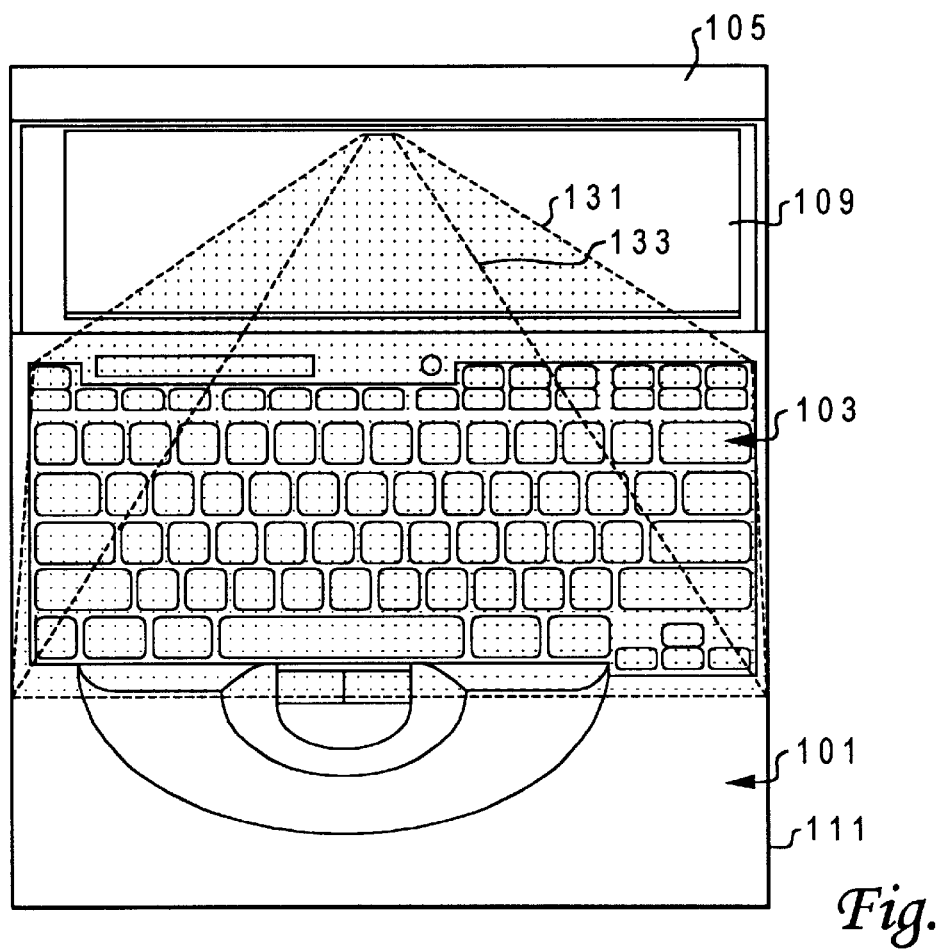

Returning again to FIG. 7, the above-mentioned parameters, such as the size of the aperture 161 and the like, are determined so that, when the back cover 105 is open to 90 degrees, a ray of light 133 farthest from the LCD 109 illuminates the farthest end of the keyboard 103 from the LCD. FIG. 7B shows a plan view of the computer shown in FIG. 7A. As shown in FIG. 7B, the light distribution characteristic is determined so that, when the back cover is open to 90 degrees, the entire keyboard is illuminated. There is no possibility that the computer 100 will be used with the back cover 105 opened to less than 90 degrees. Generally, the computer 100 is used in a range of 110 to 135 degrees. Therefore, the computer 100 is often used with the back cover further opened from the position of FIG. 7A with respect to the main body 101. If the inclined angle of the back cover 105 is gradually increased, the light ray 133 will move to this side of the main body 101 and move beyond the main body 101. However, the entire keyboard 103 is still illuminated, so there is no obstacle in the operation of the keyboard under a dark environment. Since the movement quantity of the distal end of the light ray 131 is extremely small, there is also no obstacle in the illumination of the end of the keyboard 103 near the LCD.

Figure 9:
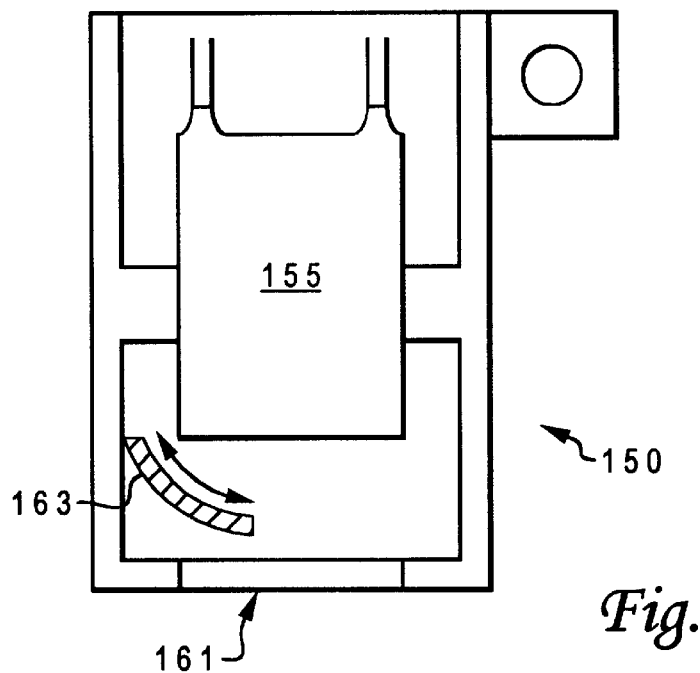
FIG. 9 is a sectional view of an LED holder with a shutter.

FIG. 9 illustrates a shutter 163 provided within the LED holder in order to prevent the light ray 133 from extending beyond the main body 101 and illuminating an unnecessary range when the back cover 105 is gradually inclined. The shutter 163 is provided within the LED holder 150 so that it is manually slidable. A mechanism for manually sliding the shutter 163 may be a mechanism which extends a shaft for fixing the shutter 163 outward from the side wall 157 of the LED holder 150 and attaches a control dial to the shaft, or may adopt any other known mechanism. It is preferable that the slid shutter 163 be provided with a locking mechanism that locks the shutter 163 at arbitrary positions. The shutter 163 fulfills a role of adjusting the opening degree of the aperture 161 in accordance with the inclined angle of the back cover 105.

Next, a description will be made of a switching controller circuit for controlling switching of the LED 155.

Figure 10:
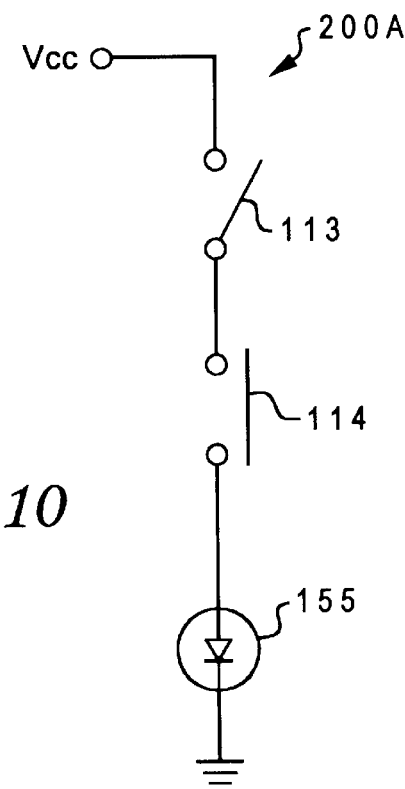
FIG. 10 is a circuit diagram showing an embodiment of a switching controller circuit that switches on and off the LED hold

The switching controller circuit 200A, as shown in FIG. 10, is constituted by a switch 113 for manually switching on or off an LED, a switch 114 that is switched on and off in interlock with the opening-closing operation of the back cover 105, and an LED 155 which is a source of light. These components are connected in series. One end of the switch 113 is connected to power source $V_{cc}$, while the other end is connected to one end of the switch 114. The other end of the switch 114 is connected to the anode of the LED 155, the cathode of the LED 155 being connected to ground. The power source $V_{cc}$ is a DC constant voltage source that is supplied from a power supplying section (not shown) mounted inside of the main body 101. This power source may supply power only when a power source for the system of the main body 101 is on, or may supply power at all times regardless of the ON-OFF state of the system power source. Note that the switch 114 is installed in the main body 101 so that it goes to an ON state when the back cover 105 is opened and an OFF state when the back cover 105 is closed.

In the above-mentioned switching controller circuit 200A, the switch 114 goes on an ON state only when the back cover 105 is open. In this state, if a user manually switches on or off the switch 113 as needed, the LED 155 is switched on or off. On the other hand, when the back cover 105 has been closed, there is normally no need to switch on the LED 155, and because the switch 114 goes to an OFF state, the LED 155 is always switched off regardless of the ON-OFF state of the switch 113. In addition, even if the back cover 105 were closed with the LED 155 switched on, wasteful power consumption can be prevented, because the switch 114 goes to an OFF state to switch off the LED 115 when the back cover 105 is closed.

Figure 11:
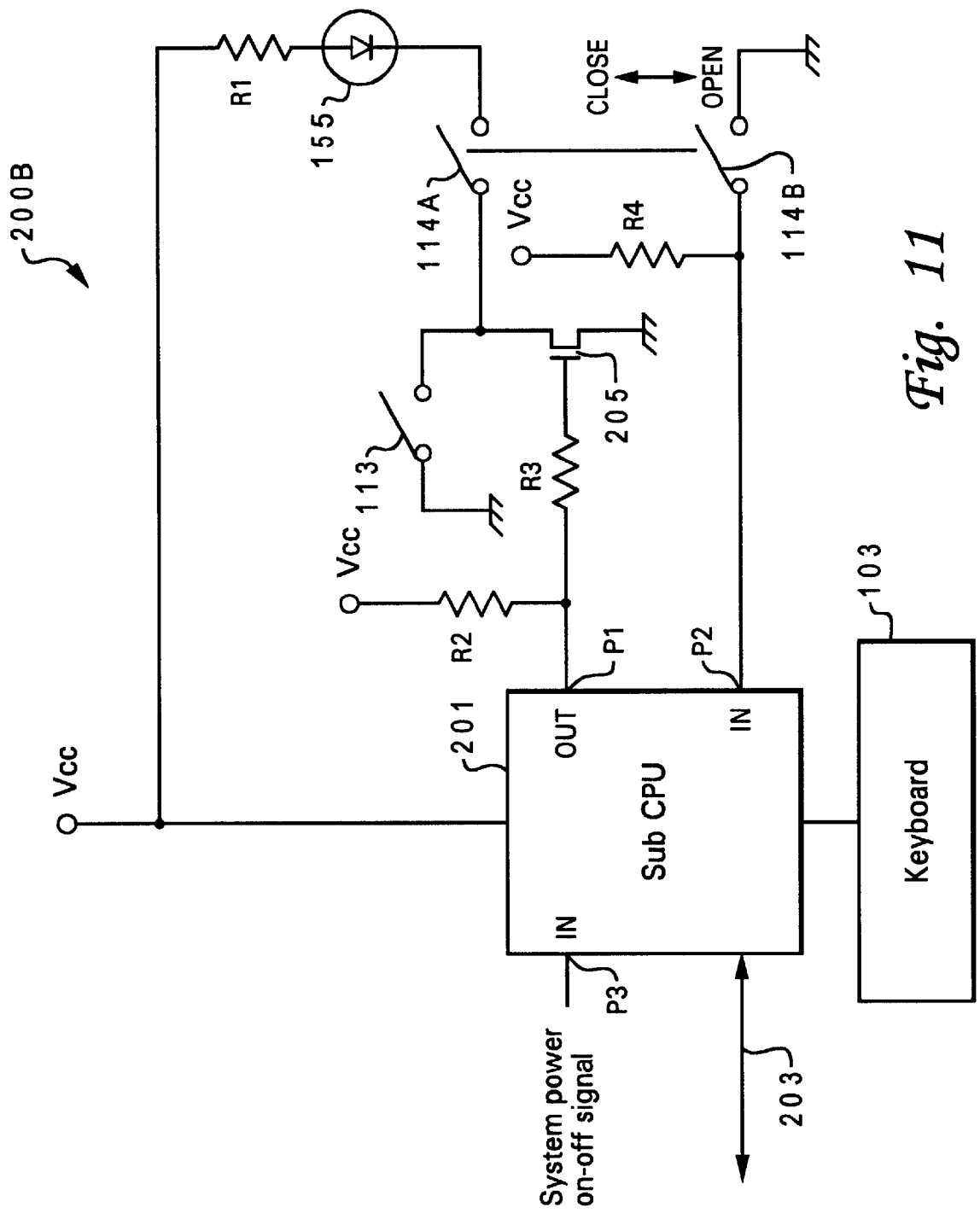
FIG. 11 is a circuit diagram showing another embodiment of the switching controller circuit.

Next, a description will be made of another switching controller circuit. The switching controller circuit 200B, as illustrated in FIG. 11, is equipped with a switch 113 for manually switching on or off an LED 115, two switches 114A and 114B which interlock with the operation of opening or closing the back cover 105, a sub central processing unit (hereinafter referred to as a sub CPU) 201 for controlling switching of the LED 155 by transmitting and receiving information between it and a main CPU (not shown) mounted inside the main body 101 for controlling the entire system, a FET 205 for performing switching operation, and an LED 155 which is a light source.

The switch 113 and the switches 114A, 114B are each configured by a unipolar single-throw type toggle switch. The switches 114A, 114B are also constructed so that their ON-OFF operations interlock with each other to make the ON-OFF states coincident with each other. Furthermore, the switches 114A, 114B are installed in the main body 101 so that they both go to an ON state when the back cover 105 is opened and an OFF state when the back cover 105 is closed. Notice that the switches 114A, 114B may be constituted by a single bipolar type toggle switch.

The sub CPU 201 is one of the peripheral controllers in the system mounted inside the main body 101 and is constituted by a single micro computer chip equipped with an MPU, a RAM, a ROM, a timer, etc. For instance, a H8/300 chip (manufactured by Hitachi) can be selected as the sub CPU 201. This sub CPU 201 is configured by including a power source controller (to be described in detail infra), which primarily performs the power management or thermal management of the entire system, and a keyboard controller (to be described in detail infra) that performs discrimination of depressed keys of the keyboard 103 disposed on the upper surface of the main body 101. Note that the keyboard 103 is connected to the sub CPU 201 so that a signal corresponding to a depressed key can be transmitted to the keyboard controller.

The power management that is performed by the above-mentioned power source controller also includes a power-saving function for suppressing battery consumption to a minimum. Here, a description will be given of the power-saving function for suppressing battery consumption to a minimum, which is provided in a notebook-sized portable computer that is excellent in portability and battery drivable. Normally, such a notebook-sized portable computer is equipped with various power-saving modes, such as a suspend mode (which suspends all operations to suppress power consumption and adds limitations to the control of accessing files: system condition S3 in advanced configuration and power interface (ACPI)), a hibernation mode (which stores memory, for data within the computer or applications being operated, in the hard disk: system condition S4 in ACPI), etc. The notebook-sized portable computer 100 applying the present invention, in addition to the above-mentioned power-saving modes, is equipped with an auto-dimming mode (which switches off at least either the LCD or the back light to suppress power consumption) and has a function that makes a transition from a normal operation mode to each power-saving mode, or from a certain power-saving mode to another power-saving mode of further suppressing consumption power, when the operating state of the system corresponds to a predetermined condition. The notebook-sized portable computer 100 has another function that returns directly to a normal operating mode, when a predetermined condition is met, for example, when a user operates keys, during operation in each power-saving mode.

Therefore, as described later, the sub CPU 201 is capable of performing the control of switching on or off the LED 155 in interlock with the power management in the system. That is, the control of switching on or off the LED 155 can be performed according to the ON-OFF state of the system power source or each of the above-mentioned operating modes of the system.

The above-mentioned power source controller is connected to a power supply controller (not shown) that is to be described infra. This power supply controller includes a charger for charging a battery and a DC/DC converter for generating DC constant voltage, such as 5 V, 3.3 V, etc., which is used in the system. The power supply controller performs power control directly under the power source controller. In addition, this power supply controller always outputs a constant voltage $V_{cc}$, when a battery is mounted in the main body 101 and is in a state capable of supplying power-source voltage or state capable of supplying power-source voltage through an AC/DC adapter. That is, the power supply controller always outputs the constant voltage $V_{cc}$ under a state capable of supplying power-source voltage to the main body 101. This constant voltage $V_{cc}$ is a power-source voltage for controlling the power source controller, the power supply controller, the switching controller circuit, etc., and is an extremely small amount of consumption power. At least either the power source controller or the power supply controller is connected to a power switch (not shown) installed in the main body 101, the power switch being used for performing an instruction for application or cut-off of power to the system.

The above-mentioned keyboard controller discriminates depressed keys of the keyboard 103 mounted on the upper surface of the main body 101, by scanning on a key matrix consisting of a plurality of predetermined keys. Therefore, as described infra, it is also possible to switch on or off the LED 155 by manipulation of predetermined keys.

The sub CPU 201 is equipped with an output port P1 and two input ports P2, P3, and a bus 203 is connected as an interface for transmitting and receiving information between itself and the main CPU.

The output port P1 of the sub CPU 201 is connected to the gate of a FET 205 through a resistor R3 and to a power source $V_{cc}$ through a resistor R2. With this connection, the FET 205 goes to an OFF state only when the output port P1 of the sub CPU 201 is in a low level and therefore the switching operation of the FET 205 can be controlled by a state on the output port P1. The source of the FET 205 is connected to ground, while the drain is connected to one end of a switch 113. The other end of the switch 113 is connected to ground. One end of a switch 114A is connected to a point between the switch 113 and the drain of the FET 205, while the other end is connected to the cathode of an LED 155. The anode of the LED 155 is connected to the power source $V_{cc}$ through a resistor R1. Note that this power source $V_{cc}$ is power-source voltage that is output from the above-mentioned power supply controller, and always supplies a predetermined voltage even when the power source switch for the main body 101 is off, when power is being supplied to the system by an AC power source or battery source. The sub CPU 210 is connected to the power source $V_{cc}$ so that voltage is supplied from this power source $V_{cc}$. Therefore, the LED 155 and the sub CPU 201 will receive a predetermined voltage $V_{cc}$ even when the power switch for the main body 101 is off. Notice that when the power switch for the main body 101 is off, the sub CPU 201 is capable of operating in a low consumption power mode.

The input port P2 of the sub CPU 201 is connected to one end of a switch 114B being connected at the other end thereof to ground. The input port P2 of the sub CPU 201 is also connected to a power source $V_{cc}$ through a resistor R4. With this connection, when the switch 114B is on (i.e., when the back cover 105 is open), the input port P2 of the sub CPU 201 goes to a low level, and when the switch 114B is off (i.e., when the back cover 105 has been closed), the input port P2 of the sub CPU 201 goes to a high level. Therefore, the sub CPU 201 can detect the opened or closed state of the back cover 105 by a state on the input port P2.

A signal line is connected to the input port P3 of the sub CPU 201 so that a signal, representing the ON or OFF state of the system by the system power switch installed in the main body 101, is input. With this connection, a signal, which represents application or cut-off of power in accordance with a state on the power switch, is input to the input port P3 of the sub CPU 201. The sub CPU 201, therefore, can detect the ON or OFF state of the system power source.

Next, the control of switching on or off the LED 155, which is carried out by the switching controller circuit 200B, will be described based on processing routines shown in FIGS. 12 through 14.

Figure 13:
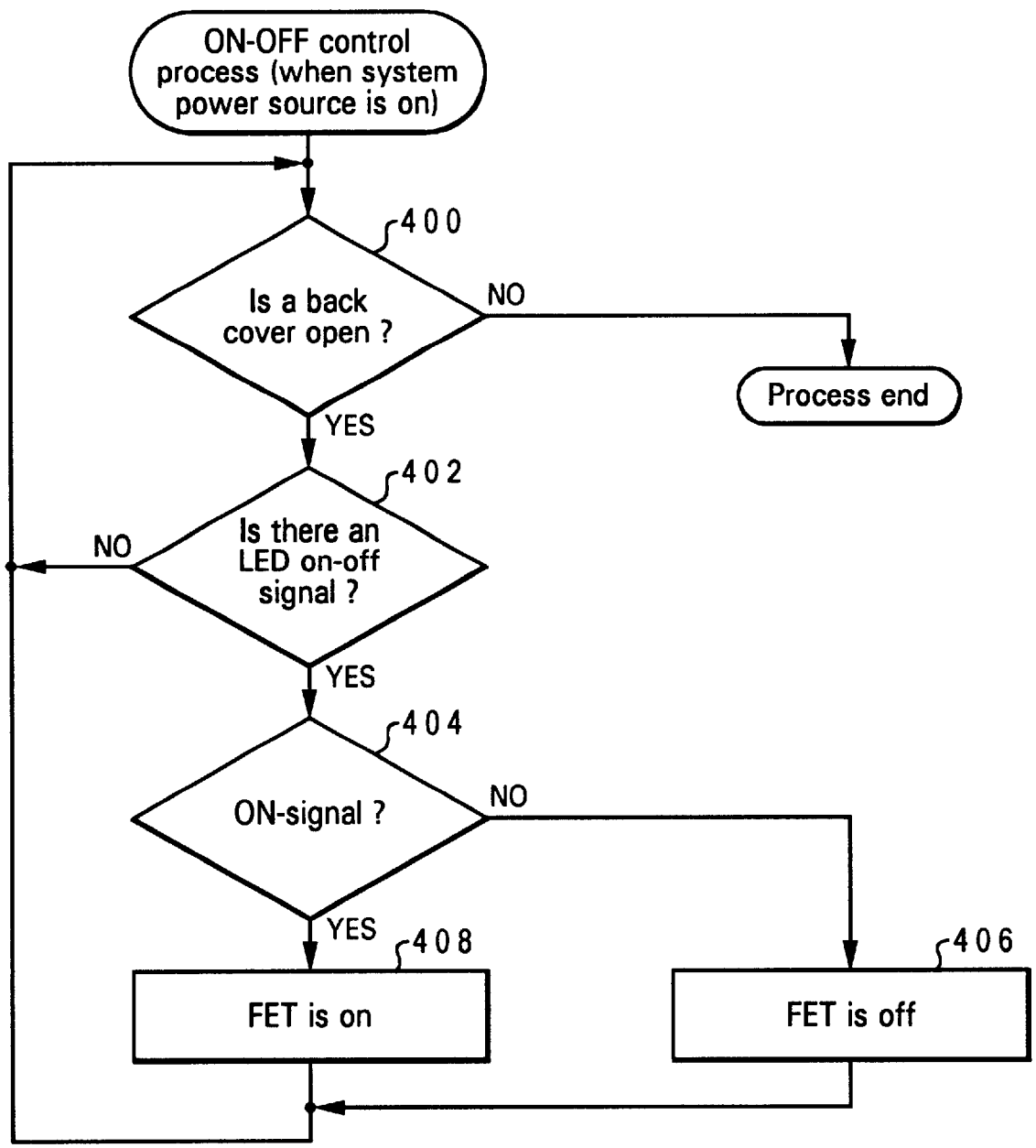
Figure 14:
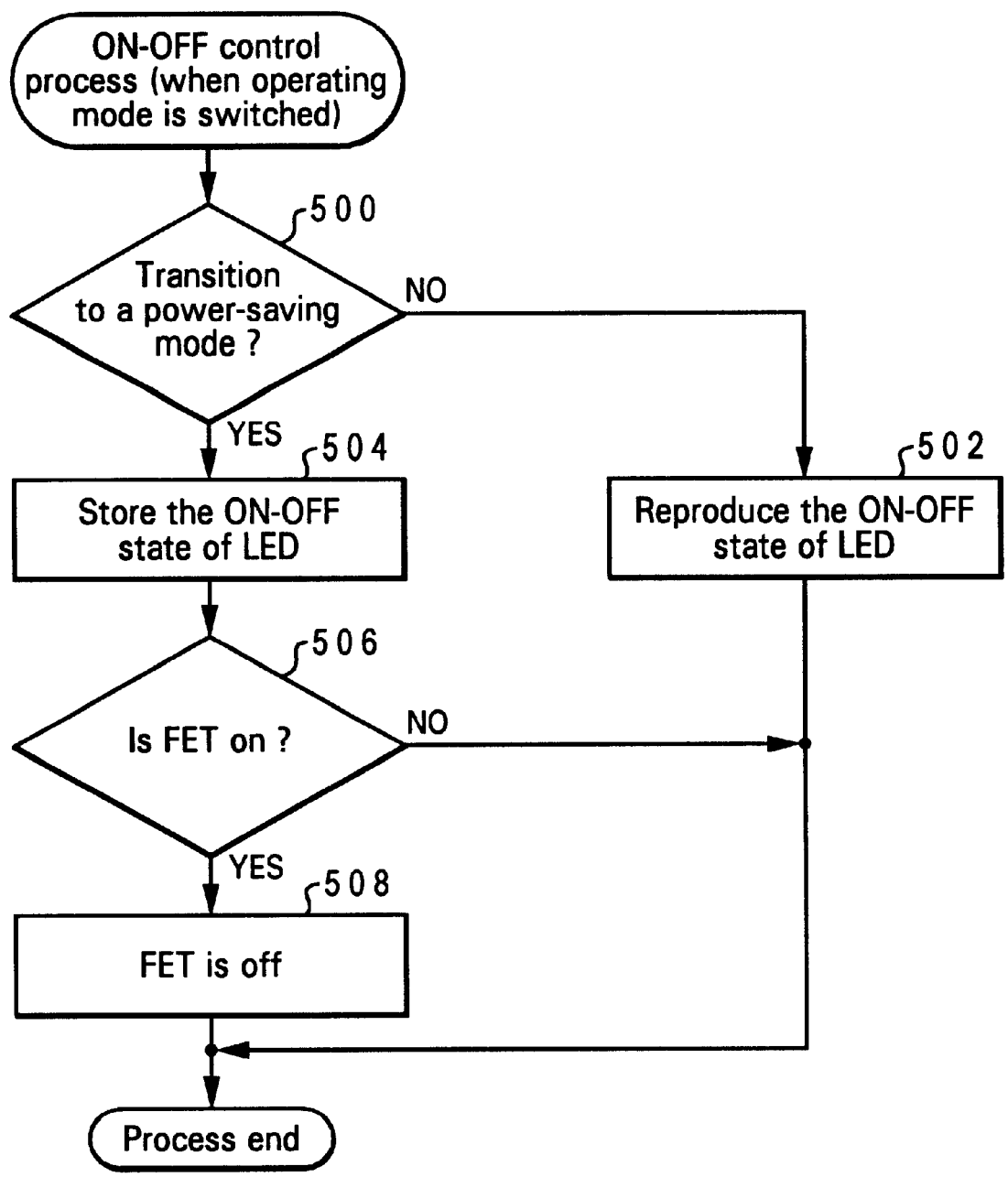
FIG. 14 is a flowchart showing the flow of processing that is executed in the switching controller circuit of FIG. 11 when the operating mode of the system is switched.

The processing routine shown in FIG. 12 is executed when the system power source is off, while the processing routine shown in FIG. 13 is executed when the system power source is on. If a user switches on or off the system power source at predetermined timing during execution of each processing routine shown FIGS. 12 and 13, the sub CPU 201 performs an interrupt process according to a system power ON-OFF signal input to the input port P3 and switches and executes the aforementioned processing routines corresponding to the ON and OFF states of the system power source. Furthermore, if switching of the operating modes of the system arises during execution of the processing routine of FIG. 13, i.e., when the system power source is on, the processing routine shown in FIG. 14 is executed by the interrupt process made by the sub CPU 201, and after the execution, the processing routine shown in FIG. 13 is again executed.

When the system power source is off, the processing routine shown in FIG. 12 is carried out. First, in step 300 the FET 205 is switched off by causing the output port P1 of the sub CPU 201 to go to a low level. Then, in step 302 it is judged, from a state on the input port P2 of the sub CPU 201, whether or not the back cover 105 has been opened. In the case where the back cover 105 has been closed, in step 302 a judgment of "NO" is made and this processing routine ends. At this time, the switch 114A is off and therefore the LED 155 is in an OFF state.

In the case where the back cover 105 has been opened, on the other hand, in step 302 a judgment of "YES" is made and the processing routine advances to step 304. Note that at this stage, the input port P2 of the sub CPU 201 is in a low level state because the switch 114B is on. Also, since the switch 114A is on and the FET 205 on, the LED 155 can be switched on or off by switching on or off the switch 113.

In step 304 it is judged whether or not a default process to be described later is unexecuted. When a judgment of "NO" is made in step 304, the processing routine returns to step 302. On the other hand, when a judgment of "YES" is made in step 304, the processing routine advances to step 306. In step 306 the default process is executed and then the routine returns to step 302. The steps thereafter are repeated. Here, the default process is the process of performing one of the three following operations previously set to the sub CPU 201 by a utility program, mounted in the main body 101, which is to be described later when the system power source is on.

(1) Switch on the LED 155 and then switch off it after the lapse of a predetermined time (e.g., 5 sec to 1 min)

(2) Switch on the LED 155.

(3) Keep the LED 155 switched off.

Note that the above-mentioned utility program is previously stored in a storage device (not shown), such as memory in the system, etc., and is software which can execute the control of switching on or off the LED 155, by controlling output of the sub CPU 201.

When the system power source is on, on the other hand, the processing routine shown in FIG. 13 is carried out. In step 400, from a state on the input port P2 of the sub CPU 201 it is judged whether or not the back cover 105 has been opened. When the back cover 105 has been closed, in step 400 a judgment of "NO" is made and this processing routine ends. At this time, the switch 114A is off and therefore the LED 155 is in an OFF state.

When the back cover 105 has been opened, on the other hand, in step 400 a judgment of "YES" is made and this processing routine advances to step 402. Note that at this stage, the input port P2 of the sub CPU 201 is in a low level state because the switch 114B is on. Also, the LED 155 can be manually switched on or off by switching on or off the switch 113.

In step 402 it is judged whether or not a signal indicating the ON-OFF state of the LED 155 has been input to the sub CPU 201. This signal indicating the ON-OFF state of the LED 155 is a signal that is output according to a predetermined key operation on the keyboard 103 by the above-mentioned keyboard controller included in the sub CPU 201, or a signal, corresponding to a command of the above-mentioned utility program mounted in the main body 101, which is input from the main CPU via the bus 203.

When a judgment of "NO" is made in step 402, the processing routine returns to step 400 and the steps thereafter are repeated.

On the other hand, when a judgment of "YES" is made in step 402, the processing routine advances to step 404 and it is judged whether or not the signal input from the main CPU or keyboard 103 to the sub CPU 201 is a signal indicating the ON state of the LED 155.

When a judgment made in step 404 is "NO," the processing routine advances to step 406. In step 406, the FET 205 is made off by making the output port P1 of the sub CPU 201 a low level, and the processing routine returns to step 400. The steps thereafter are repeated.

In this embodiment, the FET 205 is made off, so that the LED 155 is switched off. In this state, if the switch 113 is manually switched on or off, the LED 155 is switched on or off.

On the other hand, when a judgment made in step 404 is "YES," the processing routine advances to step 408. In step 408, the FET 205 is caused to be on by causing the output port P1 of the sub CPU 201 to be in a high level, and the processing routine returns to step 400. The steps thereafter are repeated. In this embodiment, the FET 205 is made on, so that the LED 155 is switched on.

If the operating state of the system corresponds to a predetermined condition when the system power source is on, the operating mode of the system is switched. When this occurs, the processing routine shown in FIG. 14 is executed.

In step 500 it is judged whether the operating mode of the system is in a state which makes a transition from a normal operating mode to each power-saving mode (including a transition from one power-saving mode to another power-saving mode) or in a state which makes a transition from a power-saving mode to a normal operating mode. When a judgment made in step 500 is "YES," the operating mode of the system is in a state that makes a transition from a normal operating mode to each power-saving mode and the processing routine advances to step 504. In step 504, the ON-OFF state of the LED 155 in making a transition from the current operating mode to another operating mode is stored in a storage region within the system. For instance, when the operating mode of the system makes a transition from a normal operating mode to a suspend mode, a hibernation mode, or an auto-dimming mode, the ON-OFF state of the LED 155 in the current normal operating mode is stored in the storage region within the system in accordance with the suspend mode, the hibernation mode, or the auto-dimming mode.

In step 506 it is judged whether or not the FET 205 is now on. When the judgment is "NO," this processing routine ends. On the other hand, when the judgment is "YES," in next step 508 the FET 205 is made off by making the output port P1 of the sub CPU 201 a low level, and this processing routine ends. In this embodiment, to cause the LED 155 to be in an OFF state when the operating mode of the system shifts to the suspend mode or the auto-dimming mode, the FET 205 is made off.

When the judgment in step 500 is "NO," on the other hand, the system is in a state that returns from each power-saving mode to the normal operating mode. In this embodiment, the system is, for example, in a resume state in which the operating mode of the system returns from the suspend mode or hibernation mode to the normal operating mode, or in a state in which the operating mode returns from the auto-dimming state to the normal operating mode. In step 502 the FET 205 is controlled by the output port P1 of the sub CPU 201 so that the ON-OFF state of the LED 155 before a transition to a power-saving mode, which was stored in the above-mentioned step 504, is reproduced, and this processing routine ends. For example, in the case of a resume state, the ON-OFF state of the LED 155 in the operating mode before a transition to the suspend mode or hibernation mode, which was stored in the above-mentioned step 504, is reproduced. When the system is in a state that returns from the auto-dimming mode to the normal operating mode, the ON-OFF state of the LED 155 in the operating mode before a transition to the auto-dimming mode is likewise reproduced.

If this processing routine ends, the above-stated processing routine shown in FIG. 13 is again executed.

As has been described hereinbefore, by employing the switching controller circuit 200B of this embodiment, it is possible to manually switch on or off the LED 155 by the switch 113, and the switching control also becomes possible by software mounted in the main body, such as a utility program. In addition, in the control of switching on or off the LED 155 by the switching controller circuit 200B, predetermined processes can be performed according to the power-saving modes.

Figure 15:
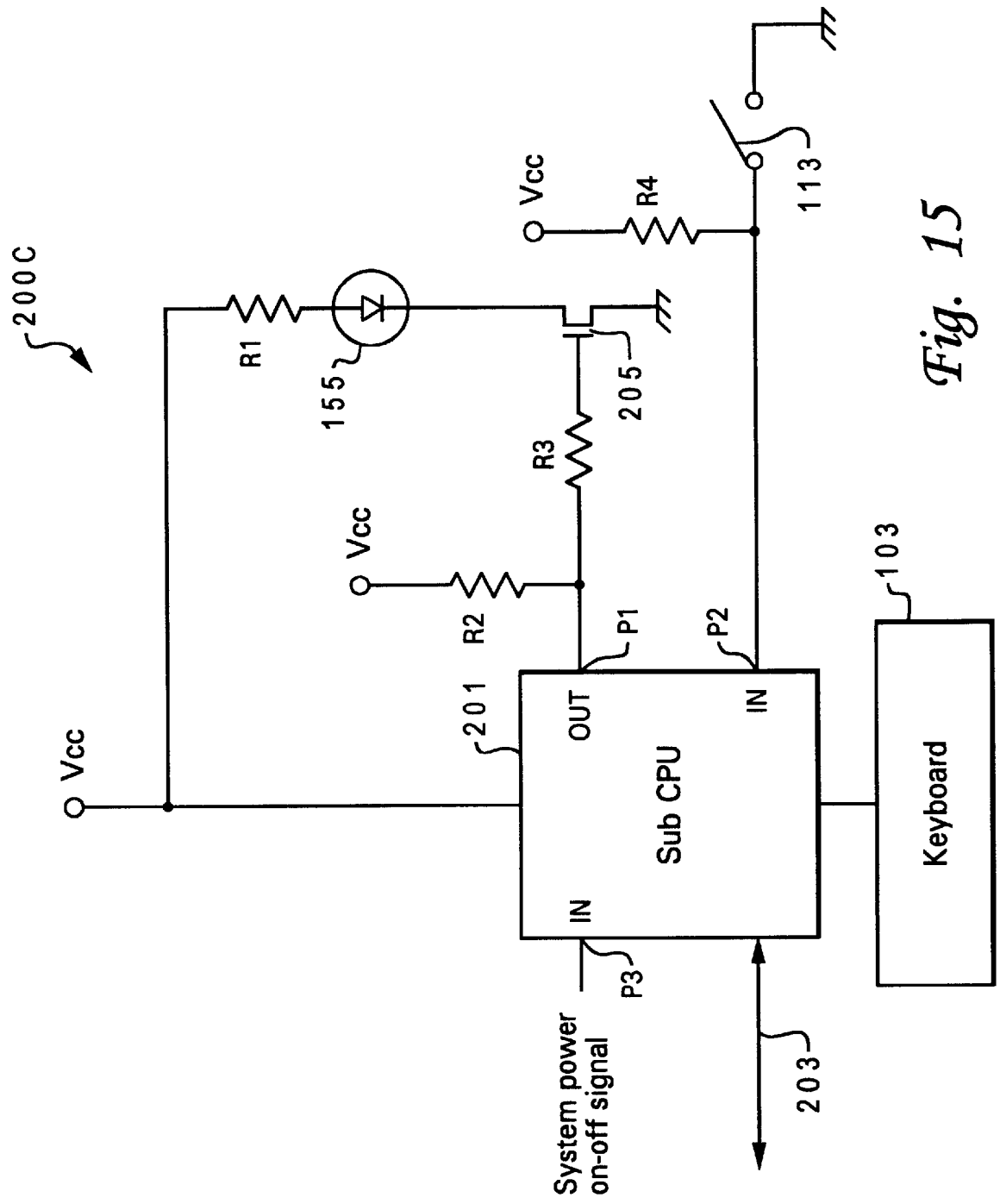
FIG. 15 is a circuit diagram showing still another embodiment of the switching controller circuit.

While the portable computer with a back cover has been described, the present invention is also applicable to computers having no back cover. In this case, the switches 114A, 114B and the resistor R4 shown in FIG. 11 are omitted and the cathode of the LED 155 is connected to the drain of the FET 200. In addition, as in a switching controller circuit 200C shown in FIG. 15, an LED 155 may be switched on or off, by omitting the switches 114A, 114B of FIG. 11, connecting the cathode of the LED 155 to the drain of the FET 205 and then connecting a switch 113 for manually switching on or off the LED 155 instead of connecting the switch 114B, and performing ON-OFF control on the FET 205 in accordance with the ON-OFF state of the switch 113 by software.

The present invention has many advantages, including a computer for disposing an LED for keyboard illumination on the upper portion of a display not realized in the prior art. This computer never degrades portability, is low in battery consumption even when the illuminator is lit, and is able to perform effective keyboard illumination having no obstacle to the visual recognition of the LCD.

In addition, according to the present invention, the ON-OFF state of the LED can be flexibly controlled by the switching controller circuit, as desired by users. Accordingly, there is an excellent advantage that effective keyboard illumination can be performed.

What is claimed is:

1. A computer capable of operating on a battery capacity, comprising:
   a main body having a keyboard mounted to an upper surface thereof;
   a back cover capable of being opened and closed, the back cover having a lower edge connected to approximately a back edge of the main body, a bezel mounted to the back cover and having an opening in an upper edge thereof, and a display mounted between the bezel and the back cover, such that the opening in the bezel is located above the display;
   an illuminator having an LED located inside an LED holder that is mounted to the back cover and extends through the opening in the upper edge of the bezel, the LED holder having a bottom portion with an aperture for directing a portion of the light emitted by the LED onto the keyboard for illumination thereof, and to prevent light emitted by the LED from directly illuminating the display, whereby visual recognition of the display by a user is not disturbed; and wherein
   the entire keyboard is effectively illuminated over a range of inclined angles of the back cover relative to the main body.

2. The computer of claim 1, wherein the aperture in the LED holder is spaced apart from a planar surface of the display by approximately 5 mm, the aperture is oriented at an angle that is perpendicular to the planar surface, and an angle defined between the bottom portion of the LED holder and the planar surface is approximately 90 degrees.

3. The computer of claim 1, wherein the LED has luminous intensity of approximately 0.26 cd and power consumption of approximately 72 mW, such that the rate of the power consumption of the LED to the battery capacity of the computer is about 0.4%.

4. The computer of claim 1, wherein the aperture in the LED holder has a dimensions of approximately 2 mm by 4 mm.

5. The computer of claim 1, wherein the LED holder has a shutter for preventing LED light from extending beyond the main body and illuminating an unnecessary range when the back cover is inclined, thereby adjusting a degree of opening of the aperture in accordance with an inclined angle of the back cover.

6. The computer of claim 5, wherein the shutter is manually operated via a mechanism for sliding the shutter.

7. The computer of claim 1, wherein the shutter has a locking mechanism that locks the shutter at selected positions.

8. The computer of claim 1, further comprising:

a switch to switch on or off the LED; and a switching controller circuit to control the switching of the LED in response to a signal from a main CPU mounted inside the main body.

9. The computer of claim 8, wherein the switching controller circuit includes at least either a keyboard controller to perform discrimination of depressed keys of the keyboard or a power source controller to control power to the entire system in response to an instruction signal from the CPU.

10. The computer of claim 8, further comprising a switching circuit constituted by connecting in series the switch as a cover switch that is switched on or off according to an open or closed state of the back cover, and a manual switch that manually switches on or off the LED, the switching circuit being connected in series to the LED.

11. The computer of claim 10, further comprising:

a switching element connected in parallel with the manual switch; and a control circuit to switch on or off the switching element according to a signal from the CPU or the keyboard.

12. The computer of claim 11, wherein the control circuit includes at least either a keyboard controller mounted inside the main body for performing discrimination of depressed keys of the keyboard, or a power source controller to control power to the entire system in response to an instruction signal from the CPU.

* * * * *